Patented July 18, 1944

2,353,658

UNITED STATES PATENT OFFICE 2,353,658

PROCESS FOR THE PRODUCTION OF DICALCIUM PHOSPHATE AND AMMONIUM CHLORIDE

Edward J. Fox, Washington, D. C., assignor to Claude R. Wickard, as Secretary of Agriculture of the United States of America, and to his successors in office No Drawing. Application January 8, 1941, Serial No. 373,620

8 Claims. (Cl. 71—43)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes, without the payment to me of any royalty thereon.

In U. S. Patent 2,143,438, dated January 10, 1939, I have described a process for the production of monocalcium chlorophosphate, a compound which in the pure state, has a composition represented by the formula, $CaClH_2PO_4 \cdot H_2O$. The formation of this compound results from a reaction between calcium chloride and phosphoric acid in which one-half of the chlorine contained in the calcium chloride is displaced by phosphate ions, yielding monocalcium chlorophosphate as a solid product and hydrogen chloride, which may be evolved as gas, according to the following equation:

$$CaCl_2 + H_3PO_4 + H_2O = CaClH_2PO_4 \cdot H_2O + HCl$$

A crude product is obtained substantially free from calcium chloride on treating phosphate rock with hydrochloric and phosphoric acids in such proportions as to yield a mixture containing calcium, phosphorus and chlorine substantially in the atomic ratio, 1:1:1, and drying the mixture. The present invention relates to the ammoniation of monocalcium chlorophosphate in a manner designed to yield substantially dicalcium orthophosphate and ammonium chloride, which may be recovered separately by solvent methods, or as a mixture of salts, suitable for fertilizer purposes.

The process affords an outlet in the form of ammonium chloride suitable for fertilizer purposes, for the hydrochloric acid resulting from the conversion of muriate of potash to other potash salts. It also effects a considerable economy in the reagent materials required for the conversion of mineral phosphate to available forms, Equation 1, as may be seen from the following comparison with the conventional method of precipitating dicalcium phosphate, Equation 2. The reagent requirements indicated are for phosphate rock containing the usual approximate proportions of seven moles of calcium to two moles of phosphoric oxide.

1. $7CaO \cdot 2P_2O_5 + 3H_3PO_4 + 7HCl +$
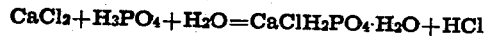
$7NH_3 = 7CaHPO_4 + 7NH_4Cl + H_2O$ 2. $7CaO \cdot 2P_2O_5 + 14HCl + 4Ca(OH)_2 =$
$4CaHPO_4 + 7CaCl_2 + 9H_2O$ Instead of wasting calcium chloride substan-
tially equivalent to the calcium in the rock, this calcium is converted to dicalcium phosphate, the hydrochloric acid requirement is cut in half and it appears in the final product as ammonium chloride. The use of milk-of-lime is eliminated.

The phosphoric acid added is only three tenths of that required to convert the rock into monocalcium phosphate, Equation 3.

3. $7CaO \cdot 2P_2O_5 + 10H_3PO_4 +$
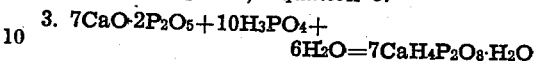
$6H_2O = 7CaH_4P_2O_8 \cdot H_2O$ It will be observed that the total quantity (moles) of reagent acid in Equation 1 is the same as that in Equation 3, but $7\frac{7}{10}$ of the amount is cheap by-product hydrochloric acid instead of the more expensive phosphoric acid. Accordingly, in the matter of converting unavailable phosphate in the rock to available forms, the ratio of the rock treated in Equation 1 to that in Equation 3 per unit of phosphoric acid is 10:3.

I have found that monocalcium chlorophosphate when treated with ammonia is converted into dicalcium orthophosphate, ammonium chloride and water.

4. $CaClH_2PO_4 \cdot H_2O + NH_3 =$
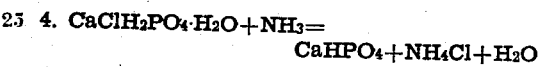
$CaHPO_4 + NH_4Cl + H_2O$

After removing the water released by the reaction there remains a mixture containing both nitrogen and phosphate in which the percentage of phosphoric oxide ($P_2O_5$) is approximately the same as in the original monocalcium chlorophosphate. At the same time the desirable physical and chemical characteristics of the material for fertilizer purposes are enhanced; first, by a reduction in hygroscopicity and, second, by the increase in plant food content.

In the operation of my process either aqueous or gaseous ammonia may be employed without danger of overammoniation, due to the fact that the correct ratio of lime to phosphoric acid for the formation of dicalcium phosphate is present in monocalcium chlorophosphate.

In my preferred procedure, ammonia gas is employed, thereby greatly reducing the amount of water subsequently to be removed by evaporation. A considerable quantity of heat is liberated by the reaction which, if properly conserved, reduces to a minimum the amount of heat required for drying the resultant mixture.

The ammoniation may be carried out in any suitable type of container or reaction chamber and the water of reaction may be removed in situ or in a subsequent operation. A typical illustration of the operation of my process is cited in the following experiment:

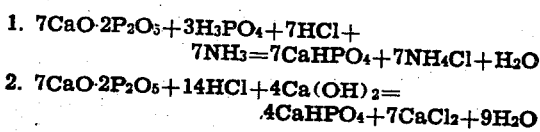

A sample of crude monocalcium chlorophosphate was placed in a 3 liter balloon flask from which air was pumped to reduce the pressure to about one-half atmosphere. Ammonia gas was then admitted to the flask until its reaction with the charge was complete. The excess gas was removed by evacuation and the product leached with water to separate the ammonium chloride from the dicalcium phosphate and other water-insoluble residues. The significant data thereon are:

Charge:

| | Grams |
|---|---|
| Monocalcium chlorophosphate, crude | 500 |
| Net gain on ammoniation of charge | 40 |
| Water-insoluble residue, dried at 110° C | 385 |

Distribution:

| Constituents | | Charge | Insoluble residue | Aqueous extract |
|---|---|---|---|---|
| $P_2O_5$ | grams | 173.0 | 165.8 | 7.2 |
| Cl | do | 85.2 | 5.0 | 80.2 |
| CaO | do | 136.5 | 136.5 | None |
| $NH_3$ | do | 43.5 | 2.7 | 40.8 |
| $CaHPO_4$ (equivalent of $P_2O_5$) | grams | 331.5 | 317.7 | |
| $NH_4H_2PO_4$ (equivalent of $P_2O_5$) | do | | | 11.7 |
| $NH_4Cl$ (equivalent of Cl) | do | 128.5 | 7.5 | 121.0 |

If instead of leaching to effect a separation of the water-soluble ammonium salts, the charge is dried, the final product consists of a mixture containing by weight approximately 67 per cent dicalcium phosphate, 26 per cent ammonium chloride and 7 per cent impurities from the phosphate rock, equivalent to 35 per cent $P_2O_5$ and 8 per cent $NH_3$, a total of 43 per cent plant food. In the product thus obtained, the ammonium chloride is uniformly distributed throughout the solid dicalcium phosphate. For fertilizer purposes, this intimate admixture has an obvious advantage over a similar mixture of discreet particles, in that the constituents cannot become segregated on handling.

Having thus described my invention, what I claim for Letters Patent is:

1. A process for producing a mixture consisting substantially of dicalcium orthophosphate and ammonium chloride comprising reacting solid monocalcium chlorophosphate, substantially free of calcium chloride, with ammonia gas.

2. A process for producing dicalcium orthophosphate comprising reacting solid monocalcium chlorophosphate, substantially free of calcium chloride, with ammonia gas, so that a mixture consisting substantially of dicalcium orthophosphate and ammonium chloride is produced, thence recovering from the mixture the dicalcium orthophosphate as a solid product.

3. The process for producing a mixture consisting substantially of dicalcium orthophosphate and ammonium chloride which process comprises reacting solid monocalcium chlorophosphate, substantially free of calcium chloride, with ammonia gas, removing the water released by the reaction, and recovering the resulting solid products of dicalcium phosphate and ammonium chloride.

4. A process for producing dicalcium orthophosphate, said process comprising reacting solid monocalcium chlorophosphate substantially free of calcium chloride, with ammonia gas, separating with solvents the ammonium chloride formed from the resulting mixture of dicalcium phosphate and ammonium chloride, and recovering the solid residue of dicalcium orthophosphate.

5. A process for the production of ammonium chloride, said process comprising reacting solid monocalcium chlorophosphate substantially free of calcium chloride, with ammonia gas, so that ammonium chloride and dicalcium phosphate is produced, adding a solvent to dissolve the ammonium chloride, separating the ammonium chloride solution from the dicalcium phosphate, and recovering the ammonium chloride salt from the solution.

6. A process for the production of ammonium chloride, said process comprising reacting solid monocalcium chlorophosphate, substantially free of calcium chloride, with ammonia gas, so that ammonium chloride and dicalcium phosphate is produced, adding water to dissolve the ammonium chloride, separating the ammonium chloride solution from the dicalcium phosphate, and recovering the ammonium chloride salt from the solution.

7. The process for producing a mixture consisting substantially of dicalcium orthophosphate and ammonium chloride comprising reacting solid monocalcium chlorophosphate, substantially free of calcium chloride, with ammonia gas to produce a mixture of dicalcium orthophosphate, ammonium chloride, and water, said reaction being exothermal, utilizing the heat produced by the reaction to vaporize water formed by the reaction leaving a substantially dry mixture of dicalcium orthophosphate and ammonium chloride.

8. The process for producing a mixture consisting substantially of dicalcium orthophosphate and ammonium chloride which process comprises reacting calcium chloride-free solid monocalcium chlorophosphate with ammonia gas so that a mixture of dicalcium phosphate, ammonium chloride and water is formed, permitting the heat generated by the reaction to expel the water formed, and recovering the resulting solid residue consisting of a substantially dry mixture of dicalcium phosphate and ammonium chloride.

EDWARD J. FOX.